(12) United States Patent
Flotte et al.

(10) Patent No.: US 8,576,093 B2
(45) Date of Patent: Nov. 5, 2013

(54) 3D NAVIGATION AID SYSTEM AND DISPLAY FOR SAME

(75) Inventors: Laurent Flotte, Aurade (FR); Gabrielle DeBrito, Lapeyrouse-Fossat (FR); Christian Nouvel, Merignac (FR); Nicolas Marty, Saint Sauveur (FR)

(73) Assignee: Thales, Neuilly-sur-Seine (FR)

( * ) Notice: Subject to any disclaimer, the term of this patent is extended or adjusted under 35 U.S.C. 154(b) by 522 days.

(21) Appl. No.: 12/870,663

(22) Filed: Aug. 27, 2010

(65) Prior Publication Data

US 2011/0210871 A1   Sep. 1, 2011

(30) Foreign Application Priority Data

Sep. 1, 2009  (FR) ...................................... 09 04143

(51) Int. Cl.
*G08G 5/04*   (2006.01)

(52) U.S. Cl.
USPC ........... 340/961; 340/963; 340/945; 340/970; 340/971; 340/977

(58) Field of Classification Search
USPC .................. 340/961, 945, 970, 971, 973, 977
See application file for complete search history.

(56) References Cited

U.S. PATENT DOCUMENTS

| | | | | |
|---|---|---|---|---|
| 5,179,377 A | * | 1/1993 | Hancock | 340/961 |
| 5,420,582 A | * | 5/1995 | Kubbat et al. | 340/974 |
| 5,448,233 A | * | 9/1995 | Saban et al. | 340/963 |
| 5,488,563 A | | 1/1996 | Chazelle et al. | |
| 6,317,663 B1 | * | 11/2001 | Meunier et al. | 701/16 |
| 6,496,760 B1 | | 12/2002 | Michaelson et al. | |
| 7,010,398 B2 | * | 3/2006 | Wilkins et al. | 701/3 |
| 7,286,062 B2 | * | 10/2007 | Feyereisen et al. | 340/961 |
| 7,609,200 B1 | * | 10/2009 | Woodell et al. | 342/176 |
| 7,907,132 B1 | * | 3/2011 | Hintz | 345/204 |
| 8,279,108 B2 | * | 10/2012 | Nouvel et al. | 342/29 |
| 2003/0107499 A1 | | 6/2003 | Lepere et al. | |
| 2004/0160341 A1 | | 8/2004 | Feyereisen et al. | |
| 2004/0178943 A1 | * | 9/2004 | Niv | 342/29 |
| 2010/0023187 A1 | * | 1/2010 | Gannon et al. | 701/7 |
| 2010/0240988 A1 | * | 9/2010 | Varga et al. | 600/425 |

FOREIGN PATENT DOCUMENTS

EP   0 565 399 A1   10/1993

* cited by examiner

*Primary Examiner* — Tai T Nguyen
*Assistant Examiner* — Peter Mehravari
(74) *Attorney, Agent, or Firm* — Baker & Hostetler LLP

(57) ABSTRACT

The invention relates to an aircraft navigational aid system with 3D display including an anti-collision device, with means of storing data representing obstructions, means for calculating a representation of the obstructions in a three-dimensional space and a device for displaying the obstructions data in three dimensions. The system includes means for augmenting the display of the representation of the area of hazardous obstructions with at least two indicator objects for the said area of hazardous obstructions disposed together in such a manner as to form a third object targeting the localization of the point in the area of hazardous obstructions closest to the aircraft. The invention also relates to the method of display of the indicator objects in a three-dimensional display.

12 Claims, 4 Drawing Sheets

3D NAVIGATION AID SYSTEM AND DISPLAY FOR SAME

CROSS-REFERENCE TO RELATED APPLICATIONS

This application claims priority to foreign France patent application No. 0904143, filed on Sep. 1, 2009, the disclosure of which is hereby incorporated by reference in its entirety.

FIELD OF THE INVENTION

The field of the invention relates to aircraft navigational aid systems and, more precisely, for terrain and/or obstacle anti-collision monitoring functions implemented for three-dimensional (3D) flight displays, of the synthetic vision system or enhanced vision system type.

BACKGROUND OF THE INVENTION

Owing to the type of missions undertaken, take-off and landing in regions with restricted access, sometimes unprepared, or low-altitude flight, the helicopter, for example, is an aircraft that is highly exposed to the risk of collision with obstacles situated within its near environment. Aside from the geographical aspects, during medical evacuation operations, the use of the helicopter is very often reserved for survival emergency cases for which the speed of action and the continuation of the mission are vital for the victim to be rescued. The urgent nature of the mission and the consequent risk taking lead to increased dangers of coming close to obstacles.

In response, the committee SC-212 of the RTCA (Radio Technical Commission for Aeronautics) aeronautics consortium has defined the minimum operational service provided by a system of the helicopter-TAWS (Terrain Awareness and Warning System) type. The aim of such a system is to generate a warning when the aircraft is in a dangerous situation which no longer complies with the operational margins.

In parallel, the committee SC-213 of the RTCA is working on the definition of the requirements of the EVS (Enhanced Vision System) and of the SVS (Synthetic Vision System). The benefit of these systems is to increase the awareness, by the pilot, of the environment around the aircraft. This is notably achieved via a three-dimensional display of the surrounding relief, which is generated either by the acquisition of data of the infrared type, or from a digital model of the terrain.

The existing solutions envisaged are systems of the TAWS type coupled or otherwise in a conventional manner with a system of the EVS/SVS type.

Systems of the TAWS type are well known to those skilled in the art. The aim of these systems is to generate a warning when the aircraft is in a dangerous situation where it no longer complies with the operational margins. TAWS systems, either as a stand-alone computer or integrated with the TCAS (Traffic Collision Avoidance System) and WXR (Weather Band X Radar) functions, within an ISS (Integrated Surveillance System), fulfil a primary monitoring function for collision avoidance with the ground ("Safety Net") and have the role of emitting audible alarms during an exceptional proximity of the ground terrain allowing the crew to react by engaging a vertical resource before it's too late. For this purpose, TAWS systems, decoupled from navigation systems, operate in two ways. They periodically calculate the theoretical trajectory that the aircraft would describe during a resource and compares it with a cross-section of the terrain and with the obstacles overflown obtained from a digital model of worldwide or local terrain loaded on board the computer. Alternatively, some TAWS systems also incorporate modes known as "reactive modes" in which, by periodically comparing certain of the current parameters of the aircraft, for example the radio-altitude and the vertical speed, various charts determine whether the current situation of the aircraft is a normal situation or whether it is potentially dangerous. In the latter case, a warning, limited to an oral message, is generated in order to inform the crew. The availability of a model of the terrain enables functions that allow the crew's awareness of the situation to be improved. Amongst these, Alert Lines are used to delimit areas of terrain for which a TAWS alert is liable to be raised. As regards the "Alert Areas", these show the areas causing a TAWS alert.

Numerous Patent documents describe this type of system. Amongst these may be mentioned the Patent EP0 565399B1 describing all of the basic concepts of TAWS systems and the Patent application US2003/0107499A1 describing a device for displaying hazardous areas of terrain capable of causing a TAWS alert.

When a TAWS system is not coupled to a system of the EVS/SVS type, the display of a TAWS is often presented in two dimensions in the form of areas of colour. Some thought is therefore required by the crew in order to make the link between the information displayed in 3D by a system of the SVS/EVS type and that displayed in 2D by a system of the TAWS type.

When it is coupled to a system of the EVS/SVS type, the existing couplings are very often based on placing the regions of colour calculated in two dimensions onto the three-dimensional structure used to represent the terrain and the obstacles. Owing to the difficulties associated with the interpretation of the 3D symbols, these couplings based on coloration requires some thought by the crew in order to determine with precision which area is to be avoided and which manoeuvre allows them to achieve this.

In addition, the display resolution of the three-dimensional space often differs from that of the two-dimensional space. This results in display for the hazardous areas in three-dimensional space when these hazardous areas have been initially calculated in a two-dimensional space of lower resolution. For example, the U.S. Patent Application Publication No. 2004/0160341 is known which proposes a solution for coupling a system of the TAWS type and display system of the SVS type.

SUMMARY OF THE INVENTION

The invention provides a technical solution for both navigational aid and anti-collision monitoring for synthetic vision or enhanced vision systems normally used solely as a navigational aid.

More precisely, the invention is an aircraft navigational aid system designed to display an area of hazardous obstructions within a three-dimensional representation of the obstructions comprising an anti-collision device, a means for storing data representing obstructions, means for calculating a representation of the obstructions in a three-dimensional space and a device for displaying the obstruction data in three dimensions, the anti-collision device being designed to detect, within an area being monitored, an area of obstructions hazardous for collisions inside a current protection envelope for the aircraft, characterized in that it comprises:

means for calculating the horizontal dimension, the vertical dimension of the said area of hazardous obstructions and the localization of the point in the area of hazardous obstructions closest to the aircraft;

means for augmenting the display of the area of hazardous obstructions with at least two indicator objects for the said area of hazardous obstructions, a first object indicating the horizontal dimension and a second object indicating the vertical dimension of the said area of hazardous obstructions, the first and the second object being disposed together in such a manner as to form a third object targeting the localization of the point in the area of hazardous obstructions closest to the aircraft.

Advantageously, the first indicator object is displayed in the form of a symbol substantially longitudinal with a horizontal axis, or in aeronautical terms an axis parallel to the horizontal axis representing for example the pitch of the aircraft, and the second indicator object is displayed in the form of a symbol substantially longitudinal with a vertical axis.

Advantageously, the third object, formed by the first and the second indicator object together, comprises at least one part substantially in the form of a T targeting the localization of the point in the area of hazardous obstructions closest to the aircraft.

Preferably, an indicator object is displayed in the form of at least two separate symbols depending on the localization of the point in the area of hazardous obstructions closest to the aircraft, a first when the said point is localized inside the displayed area representing the obstructions and a second symbol when the said point is localized outside of the displayed area representing the obstructions.

Preferably, the first indicator object is displayed in the form of a third symbol in such a manner as to indicate the presence of an area of hazardous obstructions localized outside of the displayed area representing the obstructions.

Preferably, the obstructions data represent obstructions of the terrain type and of the obstacle type.

According to one variant of the invention, the displayed obstructions data come from databases storing a digital terrain and obstacles model.

According to another variant of the invention, the displayed obstructions data come from an image acquisition means.

The invention also relates to a display method for the aircraft navigational aid system designed to display an area of hazardous obstructions within a representation of the obstructions in three dimensions, characterized in that it comprises the following steps:
  Calculation of an area of hazardous obstructions inside a current protection envelope of the aircraft,
  Calculation of the horizontal dimension of the said obstruction area, of the vertical dimension of the said area of hazardous obstructions and the localization of the point in the area of hazardous obstructions closest to the aircraft.
  Display of a first object representing the horizontal dimension of the obstruction area and of a second object representing the vertical dimension of the said area of hazardous obstructions, the first and the second object being disposed together in such a manner as to form a third object targeting the localization of the point in the area of hazardous obstructions closest to the aircraft.

The horizontal dimension is the horizontal projection of the left-hand and right-hand extremities of the area of hazardous obstructions on the horizontal axis of the area being monitored for obstructions.

The vertical dimension is the vertical projection of the top and bottom extremities of the area of hazardous obstructions on the vertical axis of the area being monitored for obstructions.

Advantageously, the first object is positioned vertically at the coordinate of the point in the area of hazardous obstructions closest to the aircraft.

Advantageously, the second object is positioned horizontally at the coordinate of the point in the area of hazardous obstructions closest to the aircraft.

The method displays at least two layers of information, the two layers being superposed and a first layer of information representing the obstructions data and a second layer of information representing the navigation data. Advantageously, the method displays the first and the second object, representing the dimensions of the area of hazardous obstructions, in the second layer of information.

A first advantage is the independence of the system and of the method with respect to the three-dimensional display systems with which they are coupled. The calculation of the indicator objects in two dimensions and the display in the three-dimensional representation within the information layer avoids having to manage a resolution adaptation, and also the masking by an area of terrain within the field of view of the information on the obstruction to be displayed, and also the incoherences in localization of the calculated point on the obstruction if the latter does not represent an area of terrain or obstacles.

A second advantage is that the objects displayed change over time according to the behaviour of the aircraft and thus provide an indication for navigation that is simple and relevant to the pilot relating to the obstruction area for which a warning is generated by the anti-collision device.

BRIEF DESCRIPTION OF THE DRAWINGS

The invention will be better understood and other advantages will become apparent upon reading the description that follows, presented as a non-limiting case, and thanks to the appended figures amongst which.

DETAILED DESCRIPTION

The invention relates to a system for aircraft navigational aid with respect to obstructions designed to warn the crew of at least one area of hazardous obstructions within a flight display of the EVS and/or SVS type. This monitoring system equips any type of aircraft but is particularly advantageous for emergency rescue helicopters generally exposed to the terrain and to obstacles. In addition, the navigational aid system comprises the following means combined together:
  An anti-collision device: the device comprises the computing means performing the function for detection of the areas of obstructions liable to present a risk of collision within a monitoring area in front of the aircraft. For this purpose, the anti-collision device calculates a protection envelope in front of the aircraft and compares the localization of the obstructions with respect to this protection envelope.

The monitoring area is defined in the horizontal plane by a semi-disc-shaped area extending in front of the aircraft and whose diameter is centred on the current position of the aircraft. The characteristics of the protection envelope vary over time as a function of the speed and the situation of the aircraft. In the horizontal plane, the protection envelope takes substantially the form of a disc sector whose sector point is positioned on the current position of the aircraft and arc of the circle within an area in front of the aircraft. The opening of the protection envelope depends on the speed of the aircraft; the higher the speed, the larger the opening of the protection envelope (or the angle of the disc sector). This is because it is necessary to increase the surface area of the area to be monitored if the speed of the aircraft is high. If the aircraft is turning, the protection envelope anticipates the turn and opens up further towards the inside of the turn. With regard to the horizontal plane, two cases of flight situation can arise: In a first situation, the aircraft follows a straight trajectory or, in a second situation, the aircraft follows an arcing trajectory. In the first situation, the protection envelope takes the form of a disc sector comprising an axis of symmetry positioned on the current trajectory of the aircraft. In the second situation, the protection envelope takes the form of a disc sector one side of which opens up towards the inside of the turn; the axis of symmetry is then offset from the current trajectory of the aircraft.

Figure 1:
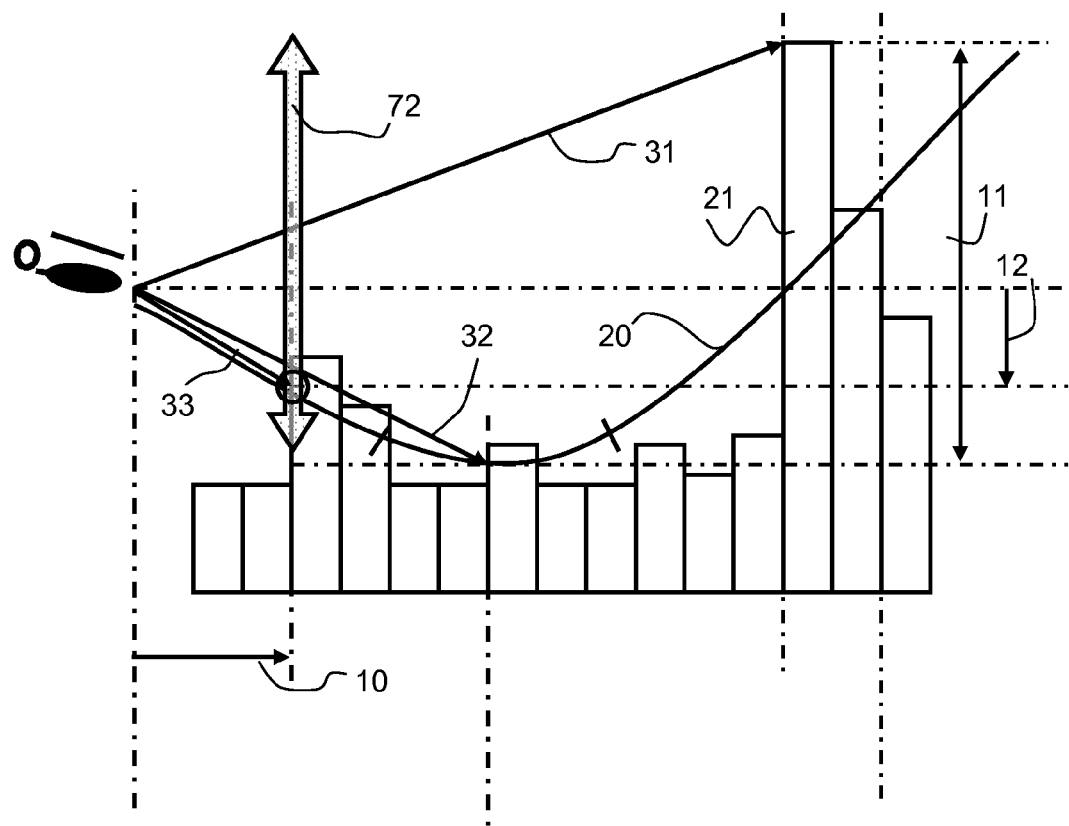
FIG. 1 shows a diagram of a vertical profile of terrain data for the purpose of illustrating the calculation of the obstructions data displayed in the display device.

FIG. 1 describes the vertical trajectory (also called 'feeler') used in the vertical plane to define the protection envelope. The monitoring area is defined in the vertical plane by a climbing trajectory 20 with a configured duration divided into several phases: A first phase for anticipation of the climbing trajectory, a second phase for trajectory initiation and a third climbing phase for the pre-configured duration. The first phase corresponds to the time for taking into account the climbing setpoint, the second phase is the transition phase between the current trajectory and the climbing trajectory. The duration of each phase is configurable and depends on the alert level associated with the feeler. The shape of the flight phases (arc of circle, parabola, straight line segment, etc.) can also be adapted according to the level of complexity that it is desired to give to the calculation algorithms. The disc sector of the monitoring area is composed of several radials (or radii of the disc sector) separated by an angle defining the sampling precision. The climbing trajectory is applied on each of these radials. In the case of a conflict between one of the radials and the terrain/obstacles digital model, a TAWS alarm is raised and the alert areas are displayed. This display is based on the application of the vertical profile of the feeler in question on each of the radials of the feeler.

The anti-collision device calculates several feelers depending on the level of alert to be generated. As far as the two most critical levels of alert are concerned ("warning" and "avoid"), the origin of the feeler is the current position of the aircraft and it is oriented according to the trajectory of the aircraft. For the first level of alert ("caution"), the origin of the cone of the feeler is the position of the aircraft displaced downstream on the trajectory of the aircraft by a time configured in the system.

The anti-collision device comprises the means for generating audible and visual alarms. Several levels of audible alarm are generated and the device is also associated with at least one display means representing an image in a two-dimensional space symbolizing the areas of hazardous obstructions.

A device for displaying obstructions data in three dimensions: the display device is implemented according to a display of the synthetic vision (SVS) type in a first embodiment or according to a display of enhanced vision (EVS) type in a second embodiment.

Means for displaying the SVS and EVS function: the display device is coupled to means for calculating a representation of the obstructions in a three-dimensional space. The display means display the data according to at least two layers of information on the screen. A first layer in the background represents the terrain data and obstacles, whereas a second layer, disposed in the foreground, represents aircraft navigation information, such as speed, pitch, altitude, etc. These display means for the SVS and EVS functions are contained within the computer of the anti-collision device or the computer of the display device itself.

A means for storing data representing obstructions. In the first embodiment with a display of the SVS type, the data representing the obstructions come from a data base containing a digital model of the terrain and of the obstacles. In the second embodiment with a display of the EVS type, the data representing the obstructions come from an image acquisition source, such as for example a thermal camera.

The navigational aid function according to the invention is carried out by the computer of the anti-collision device. The computer of the anti-collision device furthermore comprises:
  Means for calculating the horizontal dimension and the vertical dimension of the said area of hazardous obstructions and the localization of the point in the area of hazardous obstructions closest to the aircraft;
  Means for augmenting the display of the representation of the area of hazardous obstructions with at least two indicator objects for the said area of hazardous obstructions, a first object indicating the horizontal dimension and a second object indicating the vertical dimension of the said area of hazardous obstructions, the first and the second object being disposed together in such a manner as to form a third object targeting the localization of the point in the area of hazardous obstructions closest to the aircraft.

Figure 2:
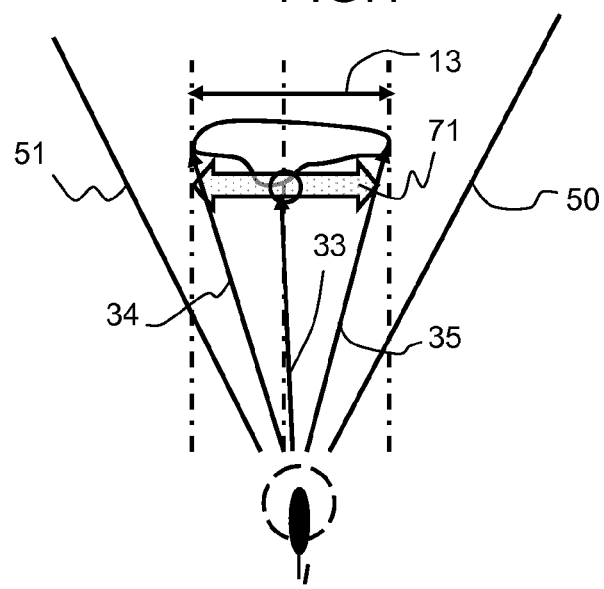
FIG. 2 shows a diagram of a horizontal plane of terrain data for the purpose of illustrating the calculation of the obstructions data displayed in the display device.

FIGS. 1 and 2 show the data calculated by the navigational aid system. The display method is designed to show an area of hazardous obstructions in a three-dimensional representation of the obstructions.

For this purpose, it comprises a first step for calculating an area of hazardous obstructions inside a current protection envelope of the aircraft. The displayed data are calculated in a two-dimensional space in the vertical profile and in the horizontal profile. FIG. 1 shows a vertical profile of obstructions 21, the trajectory of the feeler 20 defining the protection envelope of the aircraft in a vertical plane. When this feeler encounters points of the obstruction profile 21, an anti-collision alert is generated. FIG. 2 shows the area displayed by the display device bounded by the radials 50 and 51. The navigational aid system calculates the following data vectors:
  The vector 31 between the current position of the aircraft and the highest point of the obstruction profile 21 encountering the feeler 20,
  The vector 32 between the current position of the aircraft and the lowest point of the obstruction profile 21 encountering the feeler 20,
  The vector 33 between the current position of the aircraft and the point of the obstruction profile closest to the aircraft, The vector 34 between the current position of the aircraft and the left-hand extremity of the area of hazardous obstructions, The vector 35 between the current position of the aircraft and the right-hand extremity of the area of hazardous obstructions, The vectors 31 to 35 are calculated for each radial of the disc sector defining the feeler bounded by the radials 50 and 51 in the horizontal profile.

The method comprises a second step for calculating the horizontal dimension 13 of the said obstruction area, the vertical dimension 11 of the said area of hazardous obstructions and the localization of the point in the area of hazardous obstructions closest to the aircraft. From the calculation of the vectors 31 and 32, the height 11 between the highest point and the lowest point of the area of hazardous obstructions is deduced. The vertical dimension is the vertical projection of the lower and upper extremities of the area of hazardous obstructions onto the vertical axis of the area being monitored for obstructions. From the calculation of the vectors 34 and 35, the width 13 between the point of left-hand extremity and the point of right-hand extremity of the area of hazardous obstructions is deduced. The horizontal dimension is the horizontal projection of these left- and right-hand extremities of the area of hazardous obstructions onto the horizontal axis of the area being monitored for obstructions. From the vector 33, the altitude 12 with respect to the current altitude of the aircraft and the distance 10 of the point of the obstruction area closest to the aircraft are deduced.

The method comprises a third step for displaying a first object 71 representing the horizontal dimension 13 of the obstruction area and of a second object 72 representing the vertical dimension 11 of the said area of hazardous obstructions, the first and the second object being disposed together in such a manner as to form a third object targeting the localization of the point in the area of hazardous obstructions closest to the aircraft. The first object is positioned vertically at the coordinate of the point in the area of hazardous obstructions closest to the aircraft and the second object is positioned horizontally at the coordinate of the point in the area of hazardous obstructions closest to the aircraft.

Figure 3:
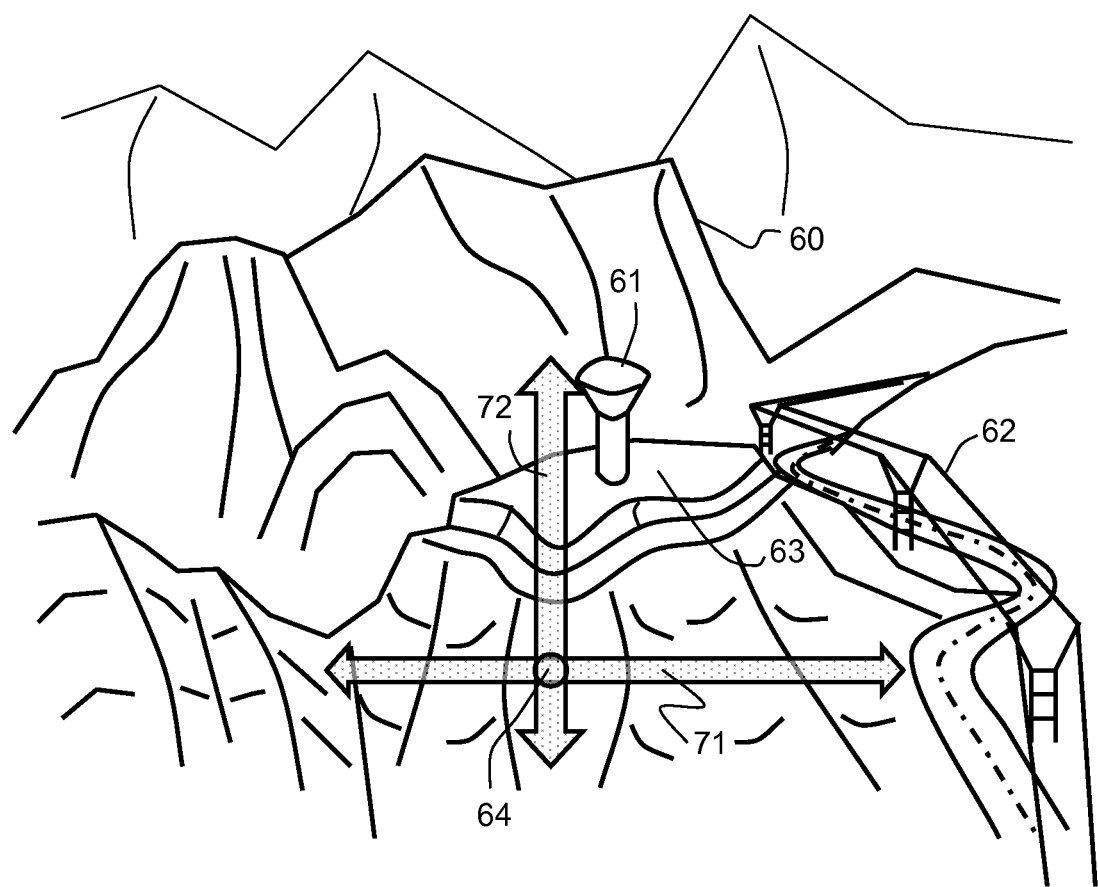
FIG. 3 shows the display of a device of the SVS type augmented by the monitoring data for obstructions.

FIG. 3 illustrates a display of the SVS type representing a flight area comprising obstructions of the terrain type 60 and 63 and of the obstacles type such as the high-voltage power lines 62 and the reservoir 61. The object 71 represents the width of the terrain area 63 that presents a hazard with respect to the current behaviour of the aircraft. The object 72 represents the height of terrain area 63 added to the height of the obstacle 61 that presents a hazard with respect to the current behaviour of the aircraft. The point 64 represents the point of the obstruction area closest to the aircraft corresponding to the point defining the vector 33 with respect to the current position of the aircraft. The first object 71 is positioned vertically at the coordinate of the point 64 in the area of hazardous obstructions closest to the aircraft and the second object 72 is positioned horizontally at the coordinate of the point 64 in the area of hazardous obstructions closest to the aircraft. Thus the first and the second object 71 and 72 are disposed together in such a manner as to form a third object (71 and 72 combined) targeting the localization of the point 64 in the area of hazardous obstructions closest to the aircraft.

FIGS. 1 to 3 illustrate a first flight situation in which the area of hazardous obstructions is positioned in the field of view of the SVS display device bounded by the lines 50 and 51. The objects 71 and 72 are represented by objects of the full arrow type each end of which is terminated by an arrow head pointing towards the exterior of the object itself; the double arrow symbolizes one dimension. However, objects of a different shape may be represented as long as the first indicator object is displayed in the form of a symbol substantially longitudinal with a horizontal axis and as long as the second indicator object is displayed in the form of a symbol substantially longitudinal with a vertical axis so as to form together a third object symbolizing a target or a pointer indicating the localization of the nearest point of the obstruction area generating the alert. Furthermore, the third object, formed by the first 71 and the second 72 indicator objects combined, comprises at least one part substantially in the form of a T targeting the localization of the point in the area of hazardous obstructions closest to the aircraft.

The dimension of the objects 71 and 72 displayed in the display device increases or decreases as a function of the dimensions of the area of hazardous obstructions detected by the anti-collision device. In the situation of FIG. 3, the object consisting of elongated shapes 71 and 72 directed onto a point of the obstruction area localized on the lower area of the area of terrain 63. This indicates to the pilot that the current trajectory of his aircraft is liable to become extremely dangerous if he maintains this same trajectory. The smaller dimension of the object 71 on the left-hand side indicates to the pilot that the flight situation on the left is preferable to that on the right in order to avoid the obstacle 63. This mode of representation by means of an object in the form of a pointer having dimensions correlated with the dimensions of the obstruction area is advantageous in the sense that the dimensions of the objects 71 and 72 also represent the flight margins remaining in order to fly round the obstruction area. In addition to indicating the area of hazardous obstructions, the pilot is informed in his display device with flight information and about flight resource to be supplied with regard to the obstruction area indicated. If the pilot raised his pitch angle and directed his heading towards the left, the point 64 would rise orienting itself into the upper left diagonal and the left-hand part of the object 71 would decrease, with respect to the intersection point 64 of the objects 71 and 72, as would the upper part of the object 72 with respect to the intersection of the objects 71 and 72.

The display functions use at least two superposed layers of information for the representation of the data on the screen of the SVS and EVS display devices. A first background layer represents the terrain data and obstacles for an SVS system or the images coming from an image acquisition means for an EVS system, whereas a second layer, disposed in the foreground, represents aircraft navigation information, such as the speed, the pitch, the altitude, etc. According to the display method of the invention, the first and the second object 71 and 72, representing the dimensions of the area of hazardous obstructions, are displayed in the second layer of information. Thus, the warning of the hazardous obstructions, for a system of the SVS type, does not have the drawback of masking the objects when the hazardous obstruction detected is positioned behind another obstruction.

Particular flight situations can occur owing to the fact that the feeler may cover areas positioned, partially or completely, outside of the viewing area displayed in the display device. These situations occur notably when the aircraft is executing turning trajectories. The reason for this is that, as was already previously described in the description of the TAWS functions, the feeler is directed as a function of the current trajectory of the aircraft. However, the display of the vision system of the SVS or EVS type may be displaced from the orientation of the current trajectory.

Figure 4:
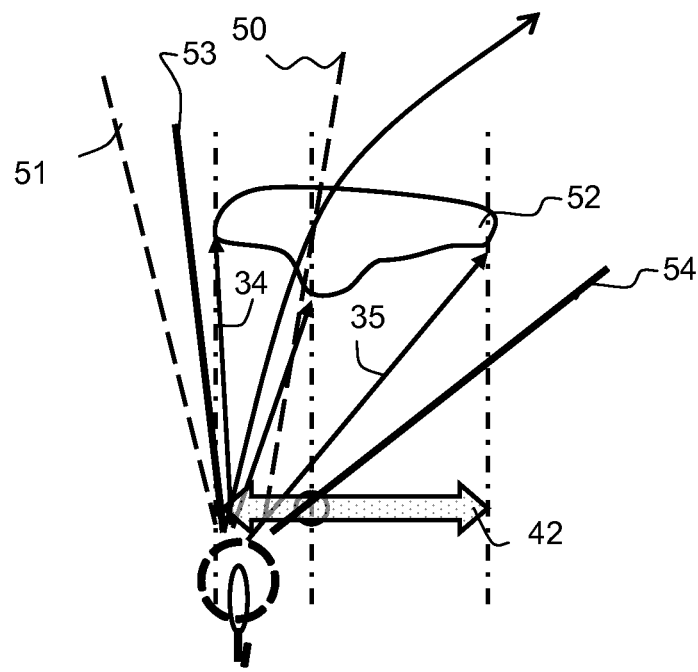
FIG. 4 shows a flight situation when the area of detected hazardous obstructions is localized in part outside of the display of the device of the SVS type.
Figure 5:
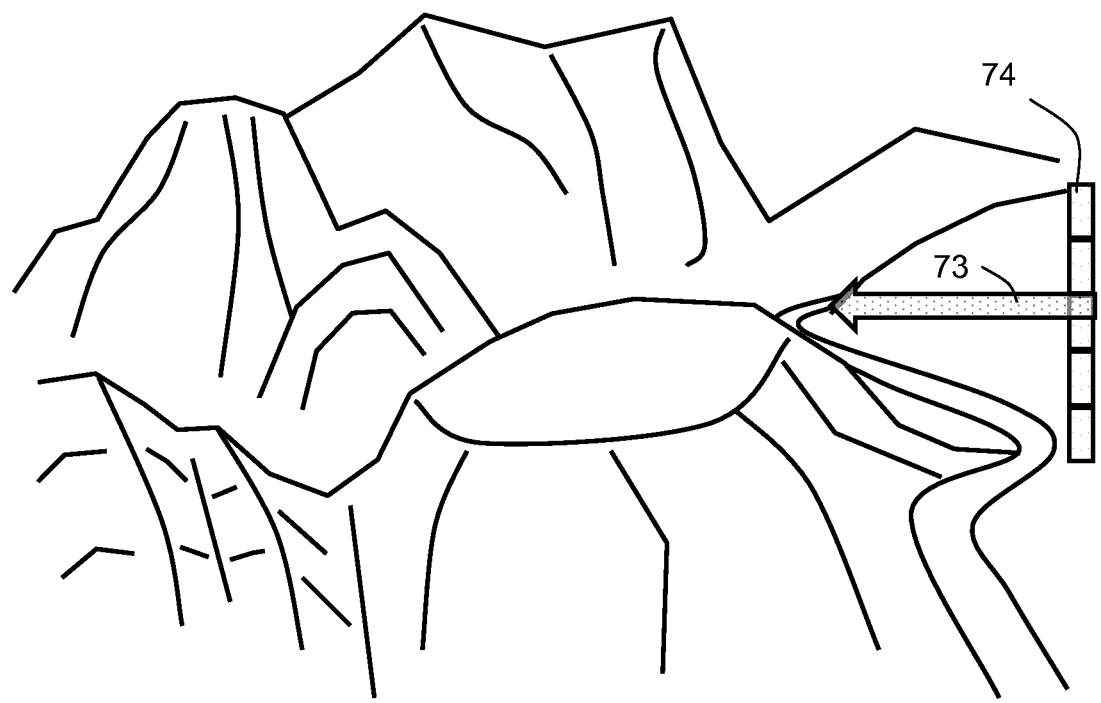
FIG. 5 shows the mode of display of the monitoring data for the situation such as described in FIG. 4.

FIGS. 4 and 5 show a second flight situation in which the area of hazardous obstructions detected is partially outside of the viewing area of the display device. FIG. 4 shows a horizontal plane in which the radials 50 and 51 symbolize the field of view represented in the display device. The protection envelope of the aircraft is bounded by the radials 53 and 54. An obstruction area 52 is detected inside the protection envelope; a part of this area is localized inside the displayed field of view, whereas another part of the obstruction area is localized outside. In addition, the point of the obstruction area closest to the aircraft is localized outside of the displayed field of view.

The representation of this type of flight situation is managed by the navigational aid system. Furthermore, an indicator object is displayed in the form of at least two different symbols depending on the localization of the point in the area of hazardous obstructions closest to the aircraft; a first symbol when the said point is localized inside the displayed area representing the obstructions and a second symbol when the said point is localized outside of the displayed area representing the obstructions. According to FIG. 5, when the point in the area of hazardous obstructions closest to the aircraft is localized outside the display, the graphical object 73 representing the vertical dimension is represented by an elongated bar at least one end of which is different from the other end. The end inside the displayed area is symbolized by a shape representing a termination, whereas the other end positioned on the display edge is symbolized by a shape suggesting continuity outside of the display. In this non-limiting display example, the object 73 takes the form of a single arrow rather than a double one as shown in FIG. 3. The object 74 representing the vertical dimension takes a different form. It is represented by a bar graduated over several levels. This object indicates that the closest localization point is outside of the displayed area and the graduated levels suggest a graduation in altitude.

Figure 6:
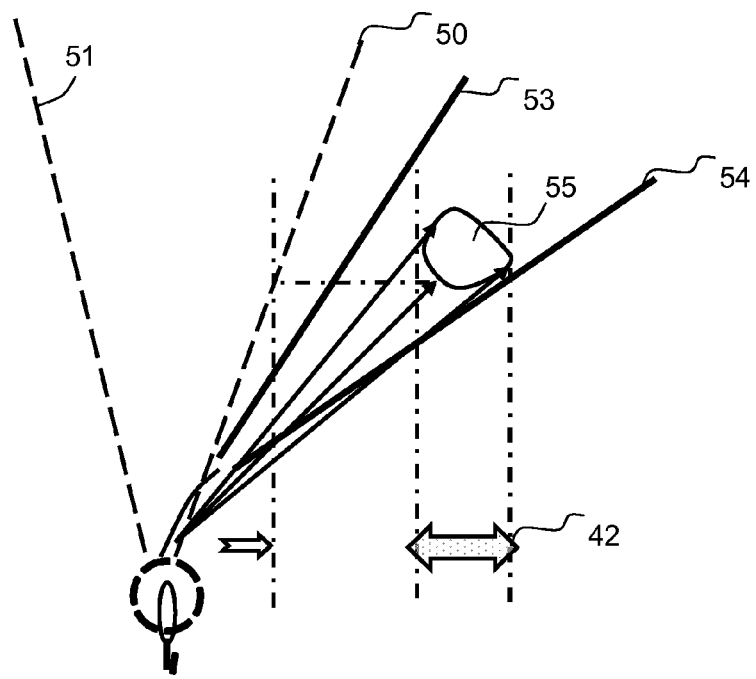
FIG. 6 shows a flight situation when the area of detected hazardous obstructions is localized outside of the display of the device of the SVS type.
Figure 7:
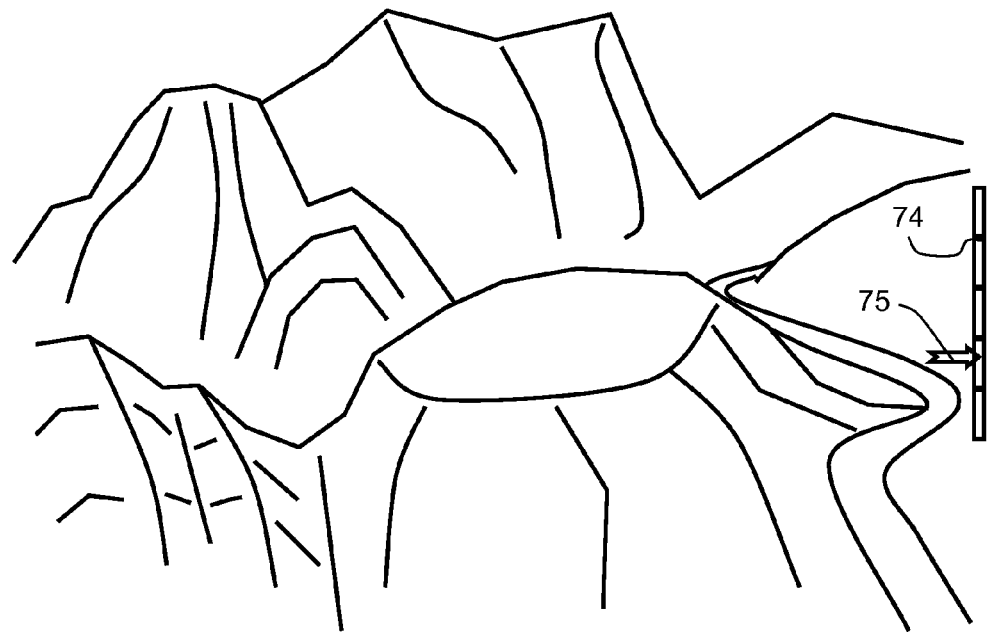
FIG. 7 shows the mode of display of the monitoring data for the situation such as described in FIG. 6.

FIGS. 6 and 7 show a third flight situation in which the area of hazardous obstructions detected is entirely outside of the area of view of the display device. FIG. 6 shows a horizontal plane in which the radials 50 and 51 symbolize the field of view represented in the display device. The protection envelope of the aircraft is bounded by the radials 53 and 54. An obstruction area 55 is detected inside the protection envelope; this area is localized entirely outside of the displayed field of view, the point of the obstruction area closest to the aircraft being localized outside of the displayed field of view.

The representation of this type of flight situation is also managed by the navigational aid system. According to FIG. 7, when the area of hazardous obstructions is localized outside of the display, the graphical object 75 representing the vertical dimension is represented by an arrow positioned on the window edge and pointing towards the exterior of the display so as to indicate the detection of an area of hazardous obstructions outside of the display. The object 73 is positioned vertically at the altitude of the point of the obstruction area 55 closest to the aircraft. The object 74 representing the vertical dimension takes a different form. It is represented by a bar graduated over several levels. This object indicates that the closest point of localization is outside of the displayed area and the graduated levels suggest a graduation in altitude.

Other particular flight situations can be represented by objects different from the objects shown in FIGS. 4 to 7, notably a flight situation where the pilot is obliged to turn round. In this case, a bar across the whole of the representation width of the flight area can be displayed in different levels of colour. The shape, the colour and, more generally, the graphical characteristics of the displayed objects have no bearing on the spirit of the invention, as long as these objects have a shape that is substantially elongated and that, in combination, they represent an object indicating to the pilot the nearest point of the obstruction area generating the TAWS alert.

The invention is intended for aircraft navigational aid systems for flight in hazardous areas and more particularly, for example, for emergency rescue helicopters.

The invention claimed is:

1. An aircraft navigational aid system for a pilot of an aircraft designed to highlight an area of hazardous obstructions within a displayed three-dimensional representation of obstructions of a monitoring area in front of and closest to the aircraft, the navigational aid system comprising:
   an anti-collision device configured to detect, within the monitoring area in front of and closest to the aircraft, said area of hazardous obstructions inside an instantaneous protection envelope for the aircraft, said anti-collision device comprising a computer configured to calculate the three-dimensional representation of obstructions and store data representing the obstructions; and
   a display device configured to display the three-dimensional representation of the obstructions, the computer of the anti-collision device further comprising:
      means for calculating, according to an instantaneous position of the aircraft, a horizontal dimension of said area of hazardous obstructions, a vertical dimension of said area of hazardous obstructions and a localization of a point in the area of hazardous obstructions closest to the aircraft; and
      means for augmenting the display of the area of hazardous obstructions with at least two indicator objects of said area of hazardous obstructions, a first indicator object of the two indicator objects indicating the horizontal dimension of said area of hazardous obstructions, and a second indicator object of the two indicator objects indicating the vertical dimension of the said area of hazardous obstructions, the first and the second indicator objects being displayed in addition to and superimposed upon the displayed three-dimensional representation of the obstructions, the first and the second indicator objects being disposed together to intersect in a manner as to form a third object targeting the localization of the point in the area of hazardous obstructions closest to the aircraft and changing over time according to the instantaneous position of the aircraft.

2. The system according to claim 1, wherein the first indicator object is displayed in the form of a horizontal symbol substantially along a horizontal axis and the second indicator object is displayed in the form of a vertical symbol substantially along a vertical axis.

3. The system according to claim 2, wherein the third object, formed by the first and the second indicator objects together, comprises at least one part substantially in the form of a T targeting the localization of the point in the area of hazardous obstructions closest to the aircraft.

4. The system according to claim 3, wherein at least one of the first and the second indicator object is displayed in the form of at least two separate symbols depending on the localization of the point in the area of hazardous obstructions closest to the aircraft, such that a first symbol in the two separate symbols is displayed when the point is localized inside the displayed area representing the obstructions and a second symbol in the two separate symbols is displayed when the said point is localized outside of the displayed three-dimensional representation of obstructions.

5. The system according to claim 4, wherein the first indicator object is displayed in the form of a third symbol in such a manner as to indicate a presence of an area of hazardous obstructions localized outside of the displayed three-dimensional representation of obstructions.

6. The system according to claim 1, wherein the displayed three-dimensional representation of obstructions represents obstructions of a terrain type and of an obstacle type.

7. The system according to claim 1, wherein the displayed three-dimensional representation of obstructions comes from databases storing a digital terrain and obstacles model.

8. The system according to claim 1, wherein the displayed three-dimensional representation of obstructions comes from an image acquisition means.

9. A display method for an aircraft navigational aid system for a pilot of an aircraft designed to highlight an area of hazardous obstructions within a displayed three-dimensional representation of obstructions of a monitoring area in front of the aircraft in three dimensions, the display method comprising:
 calculating said three-dimensional representation of the obstructions;
 detecting and calculating said area of hazardous obstructions inside an instantaneous protection envelope for the aircraft;
 calculating, according to an instantaneous position of the aircraft, a horizontal dimension of said area of hazardous obstructions, a vertical dimension of said area of hazardous obstructions, and a localization of a point in the area of hazardous obstructions closest to the aircraft; and
 displaying a first indicator object representing the horizontal dimension of said area of hazardous obstructions and a second indicator object representing the vertical dimension of said area of hazardous obstructions, the first and the second indicator objects being displayed in addition to and superimposed upon the displayed three-dimensional representation of the obstructions, the first and the second indicator objects being disposed together to intersect in a manner as to form a third object targeting the localization of the point in the area of hazardous obstructions closest to the aircraft and changing over time according to the instantaneous position of the aircraft.

10. The method according to claim 9, wherein the horizontal dimension is a horizontal projection of extremities of the area of hazardous obstructions onto a horizontal axis.

11. The method according to claim 10, wherein the vertical dimension is a vertical projection of extremities of the area of hazardous obstructions onto a vertical axis.

12. The method according to claim 9 further comprising:
 displaying at least a first and a second layer of information, the first and the second layers being superposed with respect to each other, the first layer of information disposed in a background representing the obstructions and a second layer of information disposed in a foreground representing navigation data, wherein the first and the second indicator objects, representing the horizontal and the vertical dimensions of the area of hazardous obstructions, respectively, as displayed, are in the second layer of information.

* * * * *